United States Patent [19]

Murakami et al.

[11] Patent Number: 4,780,205
[45] Date of Patent: Oct. 25, 1988

[54] PERMSELECTIVE HOLLOW FIBER MEMBRANE, PROCESS FOR THE PREPARATION THEREOF, METHOD AND APPARATUS FOR PLASMA COMPONENTS SEPARATION

[75] Inventors: Eiichi Murakami; Kimihiko Matsuzawa; Eiji Masunaga, all of Yamaguchi, Japan

[73] Assignee: Teijin Limited, Osaka, Japan

[21] Appl. No.: 887,161

[22] PCT Filed: Oct. 30, 1985

[86] PCT No.: PCT/JP85/00602

§ 371 Date: Jun. 30, 1986

§ 102(e) Date: Jun. 30, 1986

[87] PCT Pub. No.: WO86/02575

PCT Pub. Date: May 9, 1986

[30] Foreign Application Priority Data

Oct. 30, 1984 [JP] Japan ............... 59-226874
Jun. 21, 1985 [JP] Japan ............... 60-134378

[51] Int. Cl.$^4$ .................................................. E01D 13/01
[52] U.S. Cl. ............................... 210/321.1; 210/500.23
[58] Field of Search ........... 210/500.23, 500.3, 500.31, 210/500.32, 500.35, 500.41, 500.42, 500.43, 321.1–321.4, 927; 428/36, 315.5, 315.7

[56] References Cited

U.S. PATENT DOCUMENTS 4,135,942 1/1979 Kikkawa ..................... 106/155
4,402,940 9/1983 Nose et al. .................... 424/101

FOREIGN PATENT DOCUMENTS 55-27053 2/1980 Japan .
56-43417 4/1981 Japan .
58-7258 1/1983 Japan .
58-155865 9/1983 Japan .
58-175565 10/1983 Japan .
60-806 5/1985 Japan .

OTHER PUBLICATIONS

Kaneko, Iwakazu et al., "Investigation of a Filtration Device," Ikagakku 49 (Suppl.): pp. 259–261, 1979.
Agishi et al., "Double Filtration Plasmapheresis", Trans. Am. Soc. Artif. Intern. Organs, vol. 26, pp. 406–409, (1980).
Sueoka et al., "Preliminary Study of EVAL Filter for Plasma", Artif. Organs, vol. 13, No. 2, pp. 931–934, (1984).

Primary Examiner—Frank Sever
Attorney, Agent, or Firm—Sughrue, Mion, Zinn, Macpeak and Seas

[57] ABSTRACT

A permselective hollow fiber membrane which is a hollow fiber membrane, made from a wet spinnable organic high polymer, having a dense skin layer of gelated structure made to a thickness of $1\mu$ or less on at least one surface of the membrane and the rest being made up into a porous layer, a process for the preparation thereof, a method and an apparatus of plasma components separation in which said hollow fiber membrane is used.

9 Claims, 3 Drawing Sheets

|← 2.0μ →|

PERMSELECTIVE HOLLOW FIBER MEMBRANE, PROCESS FOR THE PREPARATION THEREOF, METHOD AND APPARATUS FOR PLASMA COMPONENTS SEPARATION

TECHNICAL FIELD

This invention provides a novel hollow fiber lembrane of outstanding selective permeability made of wet spinnable organic high polymer and a process for its preparation. Since the hollow fiber membrane according to this invention has a dense skin layer of gel structure formed on its surface, it has excellent separating properties in the separation of fresh human plasma components. Furthermore, this invention provides a method for separating plasma components from the plasma by use of a hollow fiber membrane prepared according to this invention to have excellent separating properties and an apparatus for plasma components separation in which said hollow fiber membrane is used as the material to separate the plasma components.

BACKGROUND OF THE ART

Of recent years the plasmapheresis-type remedy has been applied to such autoimmune diseases as hyper-$\gamma$-globulinemia, Goodpasture syndrome, chronic rheumatic disease, generalized lupus erythematosus, and hyperlipemia.

The object of the plasmapheresis-type remedy lies in the removal of high molecular proteins from the plasma existing in the immune complex or antibody, such as, for instance, anti-DNA antibody in generalized lupus erythematosus, anti-basement membrane antibody in Goodpasture syndrome, complex in immune complex nephritis, and anti-acetylcholine receptor antibody in bulbospinal paralysis. This method, however, involves weakness in that it requires the use of a large amount of human blood derivatives as the replacement transfusion to cover the plasma which has been separated and discarded. The replacement of as large quantity of plasma as possible is necessary for raising the efficacy of such plasmapheresis operation and it is said that 2.5 to 5.0 liter replacement is usually needed at a time. The operation requires so much albumin or fresh human plasma as mentioned in the above.

As a countermeasure, a trial is in practice with the operation in which the plasma, after having been separated from the blood through the first filtration membrane, is further led to the second filtration membrane where useful albumin (molecular weight about 68,000) is recovered while such high molecular proteins as immune complex, antibody immunoglobulin M (molecular weight about 900,000) hereinafter may be referred to as IgM), and immunoglobulin G (molecular weight about 160,000, hereinafter may be referred to as IgG). For instance, it is disclosed in Trans. Amer. Soc Artif. Intern. Org., vol. 26, pp 406~409 (1980) and Medic. Instn. Jour., vol. 49, Suppl. pp 259~261 (1979) that a double filtration method can be practiced by combining the separation of blood with the use of a polyvinyl alcohol membrane and the separation of plasma components with the use of ethylene vinyl alcohol membrane. Also, Japanese Laid-Open Patent Publication No. 7258/83 discloses ultrafiltration purification of plasma achieved by use of a ultrafiltration membrane which can cut away high molecular substances whose molecular weight is more than one million. Japanese Laid-Open Patent Publication No. 175565/83 moreover discloses a plasmapheresis apparatus which is designed to remove high molecular proteins from the plasma by means of permeative separation in which the blood is made to permeate through a hollow fiber membrane from its membrane surface of lower fractional molecular weight to the surface of higher fractional molecular weight. As the concrete example of such a hollow fiber membrane, the disclosure refers to a hollow fiber, as seen under an electron microscope of 10,000 magnifications, having the inner surface covered with oval pores, each with average pore size of 0.68 $\mu$ in the fiber axis direction and 0.25 $\mu$ in the direction at right angle with the fiber axis and the outer surface likely covered with oval pores, each with average pore size of 0.4 $\mu$ in the fiber axis direction and 0.12 $\mu$ in the direction at right angle with the fiber axis. Another disclosure is made in Japanese Laid-Open Patent Publication No. 155865/83 of a hollow fiber membrane for plasmapheresis use comprising a skin layer, on at least one surface of the membrane, having micropores with average pore size of 50~450 Å and a porous layer having micropores inside the membrane with average pore size of 500~1500 Å. Another related disclosure is found in Artif. Org., vol. 13, No. 2, pp 931~934 (1984).

Those membranes mentioned above are, however, not always found to be satisfactory in practical use, since they do not necessarily satisfy every property required for carrying out plasmapheresis such as high albumin recovery removing IgM and IgG, and nonlowering of separation efficiency due to the clogging developed on the porous layer.

DISCLOSURE OF THE INVENTION

It is therefore an object of this invention to provide a novel permselective hollow fiber membrane having excellent properties including high albumin recovery ratio, high ratio of removing IgM and IgG, and minimum lowering of separation efficiency due to the clogging of the membrane in the separation of human plasma components.

It is another object of this invention to provide a novel process for preparing an excellent permselective hollow fiber membrane with high productivity and reliability.

It is yet another object of this invention to provide a method and an apparatus for plasma-components separation in which said novel permselective hollow fiber membrane having the aforementioned excellent properties is utilized.

To achieve the abovementioned objects, strenuous efforts of the present inventors have been directed to the process for the preparation of hollow fiber membranes, especially with regard to their spinning conditions, coagulating technique, aftertreatment method, and structure and properties of the membrane, and our findings have reached to the conclusion that the structural stabilization of the gelated state of the hollow fiber membrane surface can be achieved most effectively by the application of a specific amount of polyhydric alcohol to the membrane immediately after the spinning of the hollow fiber and its washing with water.

More particularly, this invention proposes:

a permselective hollow fiber membrane, or a hollow fiber membrane made of a wet spinnable organic high polymer, having a dense skin layer of gelated structure made to a thickness of 1 $\mu$ or less on at least one surface of the membrane with the rest being made up into a porous layer;

a process for the preparation of a permselective hollow fiber membrane according to a characteristic method of making a hollow fiber membrane from wet spinnable organic high polymer comprising extruding a spinning solution, which contains said polymer together with an coagulating agent for making a hollow space, through the hollow fiber spinnerettes;

immersing the resulting fiber in a bath of coagulating solution, followed by washing with water;

immersing the obtained hollow fiber in an aqueous solution of polyhydric alcohol; and final drying, so that said polyhydric alcohol may be hold in the membrane ranging from 150 to 450% by weight of the organic high polymer which constitutes said hollow fiber membrane;

a method for plasma components separation to separate specific plasma components from a liquid material which contains various plasma components by use of a permselective hollow fiber membrane, wherein the hollow fiber membrane is made from a wet spinnable organic high polymer and is made to have a dense skin layer of gelated structure formed to a thickness of 1 $\mu$ or less on at least one surface of the membrane and a porous layer to make up the rest; and an apparatus for plasma components separation comprising a separating means consisting of hollow fiber membranes, a chamber to house these membranes, an inlet means to draw in a liquid material which contains plasma components, an outlet means to allow the filtrate to flow out, and another outlet means to allow the unpermeated liquid material to flow out, thus forming an apparatus of hollow fiber membrane type for separating plasma components which is characterized by having, as a separating means, a permselective hollow fiber membrane, made from a wet spinnable organic high polymer, having a dense skin layer of gelated strucutre made to a thickness of 1 $\mu$ or less on at least one surface of the membrane and the rest being made up into a porous layer.

Figure 1:
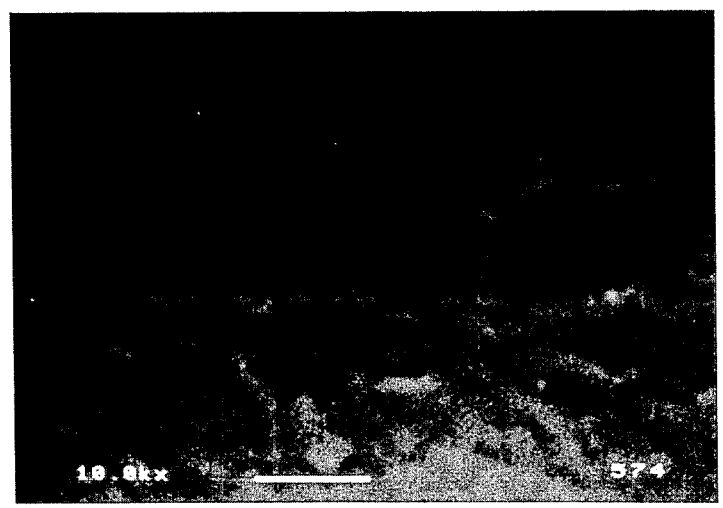
FIG. 1 shows the surface of gelated structure of a hollow fiber according to this invention after it has been impregnated with 200% by weight of polyethylene glycol and dried, as seen under an electron microscope of 10,000 magnification.

In the drawing, 1 is a constant temperature bath, 2 is the supplied plasma, 3 is an inlet plasma pump, 4 is a drip chamber, 5 is an inlet pressure guage to a plasma components separator, 6 is the plasma components separator, 7 is an outlet pressure guage on the outlet side of the plasma components separator, 8 is a recirculating pump; 9 is an outlet plasma pump, 10 is discarded plasma, 11 is an outlet pressure guage for the filtrate, 12 is a filtrate, and 13 is a constant temperature chamber.

BEST MODE OF CARRYING OUT THE INVENTION

A detailed description of this invention will be given below.

It should first be regarded that the efficiency of separation by means of a membrane generally differs much depending upon the conditions under which the human plasma is preserved. More particularly, in case where human plasma is kept in storage for a long period of time, the separation efficiency increases due most probably to the coagulation of high molecular protein contained therein and even the conventional cellulose acetate hollow fiber membrane can carry out the separation with relatively satisfactory result.

It has, however, been found that conventional membranes show the unexpectedly low efficiency in the filtration work when the plasma is subjected to the filtration process at the temperature around the body heat immediately after it is separated from patient's blood, and it has been hardly possible to remove more than 70% of IgM from the plasma by using the conventional hollow fiber membranes.

It has also been found that, when the micropores of a membrane are made so small as not to be observed under an electron microscope of 10,000 magnifications, the porosity of the membrane can not be measured by the mercury pressure method and the separation can not be achieved due to the sudden rise of the filtration pressure which occurs at the time of plasma filtration.

As the result of our continued study, it has been discovered that, if a hollow fiber of cellulose type is impregnated with an increased amount of polyhydric alcohol, which is peculiar to the fiber fresh from the spinneret, can be kept invariably, and that thus gelated hollow fbber membrane has a very excellent separating property, thus completing the present invention.

It is a general practice for cellulose hollow fiber membranes for dialysis use and other osmotic membranes to be applied with 10 to 50% by weight of glycerin and even the largest application rarely exceeded 100% by weight.

In the present invention, its constituting principle is based on the findings that a hollow fiber membrane displays a greatly increased efficiency in the separation of plasma components when it is impregnated with a large amount of polyhydric alcohol such as glycerin, etc. and that its separatrng efficiency is especially good when the application of said polyhydric alcohol is in the range of 150 to 450% by weight, preferably from 200 to 400% by weight.

It is another finding that the excellent separating performance, which is the result of the increased application of polyhydric alcohol, becomes more remarkably efficient when the hollow fiber membrane is made to form an anisotropic structure having different pore sizes in the direction at right angle with the fiber axis. Relating to said anisotropic structure, it is advisable to have a skin layer, which is made to form a gelated structure to enliven the separating function, either on the outer surface or on the inner surface of a membrane, and it is especially recommendable to have the skin layer with a gelated structure only on its outer surface in view of the better separating function. It is preferable to make the thickness of such a layer of gelated structure below 1 $\mu$, and is especially preferable to keep it below 0.5 $\mu$ and more than 0.1 $\mu$.

If the application of said polyhydric alcohol is below 150% weight, the plasma filtration pressure rises, thus lowering the permeation ratio of albumin. If the application exceeds 450% by weight, the rejection ration of IgM drops and furthermore the modularization becomes difficult. The aforementioned merits are regarded to be attributable to the fact that the gelated structure peculiar to a cellulose acetate spun fiber immediately after its spinning is consistently maintained by the application of such polyhydric alcohol as glycerin, etc. and prevents the intermolecular flocculation due to drying, so that the hollow fiber membrane comes to have a membrane structure which selectively allow only the low molecular weight substances like albumin to pass through and prevents the high molecular protein from coming into the gelated structure, thus enhancing the efficiency of separating the plasma components.

Figure 2:
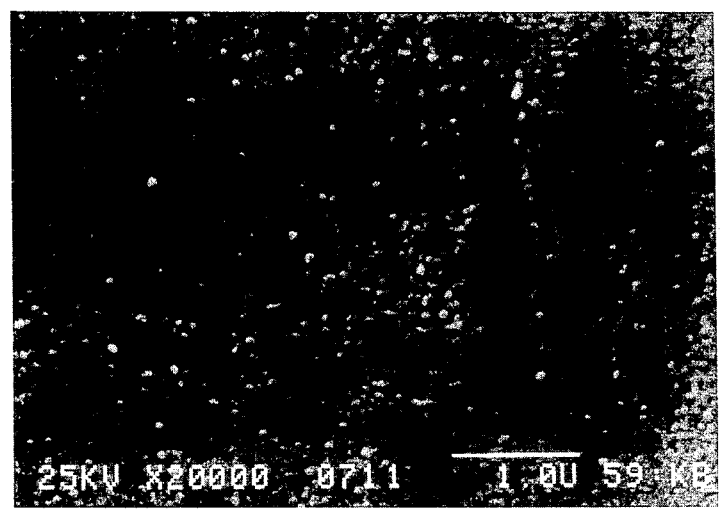
FIG. 2 shows the same surface as seen under an electron microscope of 20,000 magnifications.

The surface which is made to have a permselective gelated structure on the hollow fiber membrane of this invention presents, under an electron microscope of 10,000 magnifications, a smooth surface showing no porosity in a dry condition after having been impregnated with 150 to 200% by weight of polyethylene glycol (molecular weight 400) or glycerin (see FIG. 1). The observation of the gelated surface structure of the hollow fiber membrane under an electron microscope of 20,000 magnifications in the same conditions as above reveals that said gelated structure comprises microparticles each having a diameter ranging 0.05 to 0.2 $\mu$ to form a skin layer (see FIG. 2). Also, said hollow fiber is characterized by its discontinuous change of the structure which takes place at the boundary region between the skin layer with a gelated structure formed thereon and the porous layer (see FIG. 3). As for the porous layer, it is desirable to make the layer have a substantially uniform porous structure because such uniformity of structure increases the mechanical strength and enhance the separating property.

It is desirable to keep the inner diameter of a hollow fiber membrane of this invention in the range of 100 to 400 $\mu$, especially desirable to keep it in the range of 200 to 300 $\mu$ and its thickness should preferably be in the range of 20 to 150 $\mu$, more preferably in the range of 30 to 100 $\mu$. In the hollow fiber membrane, the thickness of the porous layer other than the layer of gelated structure should preferably be made in the range of about 20 to 150 $\mu$, and it is especially preferable to keep it in the range of about 30 to 100 $\mu$. The average diameter of the pores observed under an electron microscope should preferably in the range of 0.05 to 1 $\mu$, and more preferably in the range of 0.1 to 0.5 $\mu$. The average diameter D of the pores of the whole hollow fiber membrane calculated by the water permeability test method should preferably be 0.01 to 0.04$\mu$.

The abovementioned average pore diameter D determined according to the water permeability test method is calculated from the flow rate and the pressure loss obtained by allowing a certain amount of water to permeate through the pores of the hollow fiber membrane by the following equation $$D = \sqrt{(32\eta \cdot t \cdot J)/(Pr \cdot \Delta P)}$$

where D is an average pore diameter, t is a thickness of the membrane, J is a rate of water permeation, $\eta$ is the viscosity of water, Pr is a porosity of the membrane, and $\Delta P$ is a pressure loss.

It is also desirable to keep the volume occupation ratio of the polymer to the whole wall of the membrane made from wet spinnable organic high polymer which constitutes said hollow fiber membrane in the range of 10 to 40%.

The use of the hollow fiber membrane of this invention has now made it possible in the permeation of human plasma components to raise the albumin permeation ratio up to 80% or more, preferably up to 85% or more, and the rejection ratio of IgM up to 70% or more, preferably up to 80% or more. It has moreover the properties of raising the rejection ratio of IgG up to 20% or more, preferably up to 30% or more.

The hollow fiber membrane of this invention can work out the selective permeation of human plasma components continuously with stability almost without causing the clogging of the membrane even after the permeation of more than 3 l per 1 m$^2$ of effective membrane area, thus making it possible to perform permeation keeping the transmembrane pressure differential as low as 100 mmHg or less. More desirable range of such continuous permeation per 1 m$^2$ of effective membrane area is 4 l or more and the upper limit of the continuous permeation is 6 l. What is referred to as permeation of human plasma components in the above is conducted by partially recirculating the plasma, which has been obtained by eliminating the blood cells from the human blood by means of membrane separation, to the high pressure side of the inlet.

The permeable hollow fiber membrane of this invention can be defined by the permeability obtained by use of dextran. More particularly, it may be defined as a permselective hollow fiber membrane suitable for separating human plasma components when it proves to have the permeability of 20 to 70%, preferably 30 to 50%, for dextran having weight average molecular weight of 500,000 measured by the light-scattering method (for instance, Dextran T-500 manufactured by Pharmacia Fine Chemicals). When the permeability for dextran is below 20%, the permeability for albumin becomes less than 80%, and when the permeability for dextran is more than 70%, the rejection ratio of IgM becomes less than 70%, and in both cases the hollow fiber membrane shows a decrease in the performance of its plasma separation.

As the desirable wet spinnable organic high polymers to be used as material for producing a hollow fiber membrane of this invention, such polymers as cellulose ester, polymethyl methacylate, polyvinyl alcohol, ethylene-vinyl alcohol copolymer, polyacrylonitrile, and polysulfone may be mentioned. What is referred to as polysulfone in the above includes polyether sulfone in addition to ordinary polysulfones. As especially desirable materials, there are cellulose esters such as cellulose propionate, nitrocellulse and cellulose acetates such as cellulose monoacetate, cellulose diacetate, and cellulose triacetate.

The process for the preparation of a permselective hollow fiber membrane according to this invention is most eminently characterized by its application of 150 to 450% by weight of polyhydric alcohol effected by inersing the hollow fiber in an aqueous solution of polyhydric alcohol and drying, which is carried out immediately after its wet spinning, coagulation, and washing with water. The amount of polyhydric alcohol applied to a hollow fiber membrane mentioned above is an amount expressed in terms of percentage by weight as against the dry weight of a hollow fiber membrane after drying with no polyhydric alcohol applied thereto.

The aforementioned polyhydric alcohol is one which has two or more hydroxy groups per molecule and its molecular weight should preferably be in the range of 46 to 2000, more preferably be in the range of 75 to 800. In the application of polyhydric alcohol, a choice between the single use of one kind and the combined use of more than one kind hardly produces any different result, and in some cases the mixed use of polyhydric alcohol and other material of such a small amount as not cause damage to the polyhydric alcohol may be admitted. As examples of such polyhydric alcohol, such glycerines as glycerol, diglycerol, triglycerol, and polyglycerol; such glycols as ethylene glycol, diethylen glycol, triethylene glycol, polyethhlene glycol, propylene glycol, and dipropylene glycol; erythritols; such pentitols as arabitol, and adonitol; and such hexitols as sorbitol, mannitol, iditol, and talitol may be mentioned. Of these mentioned above, glycerol, diglycerol, triglycerol, ethylene glycol, diethylene glycol, and sorbitol are preferable, and glycerol is especially excellent.

The ultrafiltration rate (UFR) for water of a permselective hollow fiber membrane comprising a wet spun hollow fiber treated with the application of 150 to 450% by weight of polyhydric alcohol according to this invention is in the range of 50 to 350 ml/m$^2$.hr.mmHg. When the application of polyhydric alcohol is set in the range of 150 to 350% by weight, the result is inclined to the making of a hollow fiber membrane with UFR in the range of 50 to 350 ml/m$^2$.hr.mmHg, and the application of polyhydric alcohol is increased to the range of 200 to 450% weight, a hollow fiber membrane of UFR ranging from 150 to 350 ml/m$^2$.hr.mmHg is obtained with relative ease.

In case where the application of glycerin to the same hollow fiber membrane was set below 150% by weight, the UFR dropped to 50 ml/m$^2$.hr.mmHg, and where an attempt was made to increase the application of glycerin up to 450% by weight or more, the adhesive strength decreased to such a degree as to make it impossible to form a module capable of standing for the necessary measurement, which proved that it is substantially impossible to apply glycerin of 450% by weight or more.

As the concrete examples of wet spinnable organic high polymer to be used in the manufacturing process of this invention, such polymers as cellulose ester, polymethyl methacrylate, polyvinyl alcohol, ethylene-vinyl alcohol copolymer, polyacrylonitrile, and polysulfone may be mentioned. Preferable materials out of those mentioned above are cellulose esters such as cellulose acetate and nitrocellulose, and ethylene-vinyl alcohol copolymer, of which cellulose ester is especially preferable.

As the spinning solution or dope to be used in the manufacturing process of this invention, it is desirable to use a mixed solution comprising at least one kind of nitrogen-containing compounds expressed by the following formula (I)

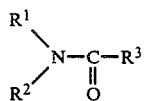

(I)

wherein $R^1$ and $R^2$ are identical with or different from each other, each representing a hydrogen atom or an alkyl group of 1 to 3 carbon atoms; $R^3$ represents a hydrogen atom, an amino group expressed by

(where $R^4$ and $R^5$ are identical with or different from each other, each representing a hydrogen atom or an alkyl group of 1 to 3 carbon atoms), or an alkyl group of 1 to 3 carbon atoms, and in case where both $R^1$ and $R^3$ are alkyl groups, they may collaborate with each other to form a ring, said organic high polymer, lower ketone, lower alcohol, and, if necessary, divalent metallic salt.

As the nitrogen-containing compounds expressed by formula (I), such chain amides as formamide, dimethylformamide, N-dimethylacetamide, and propionamide; such cyclic amides as N-methylpyrrolidone, ε-caprolactam, γ-valerolactam, and α-piperidone; and such ureas as urea, dimethylurea, tetramethylurea, containing compounds expressed by formula (I), formamido, dimethylformamide, N-dimethylacetoamide, N-methylpyrrolidone, ε-caprolactam, and urea are preferable.

As the lower ketones to be used in this invention, there are ketones of 3 to 7 carbons and as preferable ones there are ketones of 3 to 5 carbons and to give concrete examples, acetone and methyl ethyl ketone may be mentioned. As the lower alcohols to be used in this invention, there are univalent alcohols of 2 to 7 carbon atoms, of which methanol, ethanol, propanol, pentanol, hexanol, heptanol, cycloheptanol, and cyclohexanol are preferable ones. As the divalent metallic salts, calcium chloride and magnesium chloride are recommendable. The aforementioned organic high polymers, lower ketones, lower alcohols, and metallic salts may be used either singly or in a mixed combination of more than one selected from the respective component items.

It is desirable that the spinning solution of this invention should contain said organic high polymer such as cellulose acetate in the range of 15 to 25% by weight to secure the stability of spinning inclusive of the spinning viscosity and the hollow fiber membrane performance.

The concentration of the aforementioned nitrogen-containing compounds of formula (I) to be contained in the spinning solution directly affects the pore size of the porous layer on the hollow fiber membrane and it is advisable to control the content in the range of 10 to 40% by weight, more preferably in the range of 20 to 40% by weight.

As for the mixing ratio by weight of lower ketone and lower alcohol in the spinning solution, it is recommendable to set the ratio of lower ketone/lower alcohol in the range of 2.5/1 to 5/1 taking the solubility of the organic high polymer and the spinning stability into consideration.

Divalent metallic salts may be added to the spinning solution as case may require and in such a case the concentration of such a divalent metallic salt such as, for instance, calcium chloride should desirably be in the range of 0.1 to 5.0% by weight, more preferably in the range of 0.1 to 3.0% by weight to adjust the pore size of a hollow fiber membrane to be produced. A hollow fiber membrane of small pore size can be obtained with ease when the concentration of calcium chloride is low. The spinning solution may have water or other substance contained therein within such limits as the existence of such substances does not adversely affect the spinnability and the performance of the hollow fiber membrane.

As the method of preparing the spinning solution, any existing known methods can be applicable and, for instance, the following one may be adopted. A nitrogen containing compound is added to an organic high polymer and thoroughly stirred. A methanol soluton of calcium chloride dihydric salt was added and mixed. Then acetone was added thereto and the mixture was stirred for more than 5 hours to complete the solution, followed by aftertreatment such as filtration, if necessary.

In this invention, wet spinning is effected by extruding the spinning solution thus prepared through circular nozzles. The circular nozzles may be of any type so far as they can produce desired hollow fiber membranes.

As the coagulating solutions for the outer surface and the inner surface of a hollow fiber, the use of mixed solutions such as water-lower alcohol, water-lower ketone, and water-lower alcohol-lower ketone is desirable and these solidifying solutions may contain such salts as nitrogen-containing compound of the aforementioned formula (I), calcium chloride, and other compounds.

In the process for the preparation of a hollow fiber membrane according to this invention, it is possible to control the average pore sizes of the outer layer of the hollow fiber and the inner layer of the hollow fiber by adjusting the components of the respective coagulating solutions for the inner layer use and the outer layer use, thus making it available to obtain a so-called anisotropic hollow fiber membrane with its outer layer and the inner layer made different from each other in their denseness depending upon the mode of process. The making of the anisotropic structure can be achieved by using a coagulating solution, whose coagulating rate is larger than the other caogulating solution, to form a denser structure on the desired layer. It is especially desirable to effect anistropism with a denser structure formed on the outer surface of the hollow fiber, because the making of stable membrane is easy and the effective separating area is larger on the outer surface than on the inner surface. Thus formed dense skin layer is made to have a gelated structure, which is regarded to be kept stably by the application of a great amount of polyhydric alcohol according to this invention.

More detailed explanation as to the process for preparing such a hollow fiber membrane mentioned above is made hereunder by taking a cellulose acetate hollow fiber membrane as a concrete example. Cellulose diacetate to be used is one generally obtainable on the market. The one having the acetification ratio of 40 to 55% and polymerization degree of 150 to 200 is usable. Cellulose diacetate is first dissolved in a mixed solvent of acetone and methanol and a nitrogen-containing compound such as formamide, urea, dimethylformamide, N-dimethylacetoamide, N-methylpyrrolidone, and ε-caprolactam is further added thereto as a swelling agent. Furthermore, a minute amount of calcium chloride may be added as a coagulation control agent. These spinning solution components consist of 16 to 20% cellulose diacetate, 20 to 40% nitrogen-containing compound, and 0 to 1.0% calcium chloride, the rest being a mixed solvent of acetone-methanol, whose mixing ratio should recommendable be in the range of 2.5 to 5.0, which actually facilitates the spinning process. The use of more than one swelling agent is more apt to cause uneven coagulation than the use of a single agent and is therefore advantageous to the making of an anisotropic hollow fiber membrane. In the making of an anisotropic hollow fiber membrane, it is advisable to keep the thickness of the layer, whose surface is made to have a gelated structure for increased separating performance, less than 1 $\mu$ and it is especially preferable to maintain the thickness below 0.5 and above 0.1 $\mu$.

The spinning solution extruded into the coagulating solution of water-methanol (1:1) Through the circular nozzles and a specified amount of the coagulating solution of the same composition is injected into each fiber to treat its inner surface. The obtained hollow fibers are washed with water, bundled into hanks, and again washed thoroughly with water to have the organic substances removed substantially. After that, the hollow fibers are immersed in a solution of polyhydric alcohol. The concentration of polyhydric alcohol should be in the range of 20 to 80%, preferably in the range of 40 to 60%. After taken up from the immersion bath of polyhydric alcohol, the hollow fiber membranes are subjected to hot air drying at 50° C. or thereabout.

The amount of polyhydric alcohol applied to the hollow fiber membrane thus prepared is 150 to 450% and the membrane accordingly has a property of displaying and extremely small change of volume, when it is again immersed in water.

The method of plasma components separation of this invention effects the separation of specific plasma components from a liquid substance which contains plasma components by use of a novel hollow fiber membrane( which has a dense skin layer with theaforementioned gelated structure formed on one surface, at least, of the layer, as a separating material. An excellent separating property is displayed when plasma components are made to pass through the layer from the surface of gelated structure to the other surface. More preferably, the use of a hollow fiber membrane which is made to have such gelated structure only on the outer surface of the layer makes it possible to effect the separation of plasma components very advantageously.

In regard to the liquid substance which contains plasma components to be used in the method of plasma components separation, no specific limit is placed on its definition, and it may be an ordinary plasma obtained by removing blood cells from the blood, partially concentrated plasma, plasma which is diluted with other substance, or fresh blood as case may require.

The abovementioned method for plasma components separation may be conducted under any separating conditions and no limitation is set for such conditions so far as the conditions are not so severe as to damage the properties of the membrane such as mechanical strength and separating efficiency. To speak of the temperature for separation, it is preferable to keep it below 45° C., especially in the range of 30° to 40° C. close to the human body temperature, and, if case may require, it may be somewhere around room temperature. The transmembrane pressure difference between the outside and the inside of the hollow fiber membrane should approximately be lower than 500 mmHg, preferably lower than 300 mmHg, and most preferably lower than 100 mmHg.

The method of plasma components separation may, in permeatively separating albumin and other components with small molecular weight from the plasma for instance, take on any mode of separating systems such as the partial recirculating method by which part of or whole of the unpermeated residual plasma is recirculated to be mixed with the feedstock plasma; the simple filtrating method by which only filtrate is made to flow out of the filtrate chamber in which the hollow fibers are housed as the filtrating material; the partial discarding method by which part of the unpermeated residual plasma is discarding; and other method in which any of the aforementioned methods are combined. Of these methods, a method in which the partial recirculating method and partial discarding method are combined together often proves advantageous because of its efficient separating performance due to the infrequent occurrence of binding.

An apparatus for plasma components separation provided by this invention is an apparatus for plasma components separation hollow fiber membrane type comprising a hollow fiber membrane separating functional element, a chamber which houses the element, a hollow fiber membrane supporting partition, an inlet for plasma components containing liquid, an outlet for the filtrate, and an outlet for the unpermeated residual plasma, being characterized by use of said hollow fiber membrane which has a dense skin layer with a gelated structure at least on on of its surfaces as the separating functional element. The apparatus for plasma components separation should desirably be designed to use the aforementioned hollow fiber membrane having a dense skin layer only on its outer surface and to have the inlet for the feedstock plasma components set in such a way as to direct the inflow of the feedstock to the outer surface of the membrane.

In making the abovementioned apparatus for plasma components separation, no limit is especially placed on the use of the assembly components except for said hollow fiber membrane and any materials and structures may be used if they are designed for use on a separating apparatus of hollow fiber membrane type. Though no limit is especially set as to the arrangement and number of the hollow fiber membranes, it is desirable to have the arrangement of the hollow fiber membranes and the structure of the separating apparatus designed in such a way as to avoid the occurrence of concentration polarization and channeling to the plasma to be separated.

As a concrete example of such separating apparatus, a module for separating plasma components of hollow fiber type, or a plasma components separator, was made by placing the hollow fiber membranes of this invention in a cylindrical container made of polycarbonate in an arrangement to have an effective membrane area of 1.0 m$^2$ in a representation of outer surface. Its holding capacity is about 50 ml each for the inside and the outside of the hollow fibers. The abovementioned plasma components separator was set in the flow circuit shown in FIG. 4 and then the plasma components separation was conducted under the conditions described below by using fresh human blood plasma obtained by filtration with a plasma separator. The fresh human blood plasma warmed up to 37° C. was supplied continuously to the outside of the hollow fibers housed in the plasma components separator at a flow rate of 20 ml/min, while recirculating the plasma to be filtrated on the outside of the hollow fibers at a flow rate of 100 ml/min and also discarding the plasma to be filtered at a flow rate of 2 ml/min, thus the rest being forced to flow through the hollow fibers from the outside to the inside to carry on the plasma components separation until the transmembrane pressure difference reached 100 mmHg. The result showed that the apparatus for plasma components separation equipped with the hollow fiber membrane of this invention, as compared with a hollow fiber membrane with the application of glycerin of below 150% by weight, proved to have a high ratio of permeation for albumin in excess of 80% assuring a very good recovery of albumin and also to have a rejection ratio of 30% or more for IgG and 80% or more for IgM. The increase in the transmembrane pressure difference resulting from the clogging of membrane pores was small and the permeation of plasma was recognized to be 3 1 or more.

The physical properties of the hollow fiber membrane of this invention, including the ultrafiltration rate (UFR) for water, permeation ratio for albumin in the continued filtration of the human plasma components, rejection ratio of IgG, rejection ratio of IgM, permeation ratio of dextran, and transmembrane pressure difference are as follows. The ultrafiltration rate (UFR) for water was obtained from the difference of pressure $\Delta P$ (mmHg) between the outside and the inside of the hollow fibers, which letting water pass from the outside to the inside of the hollow fibers at a flow rate of 400 ml/min after the plasma conponents separator had been washed with water thoroughly, by the following equation.

$$\text{UFR (ml/m}^2\text{.mmHg.hr)} = (400 \times 60)/(\Delta P \times S)$$

Figure 4:
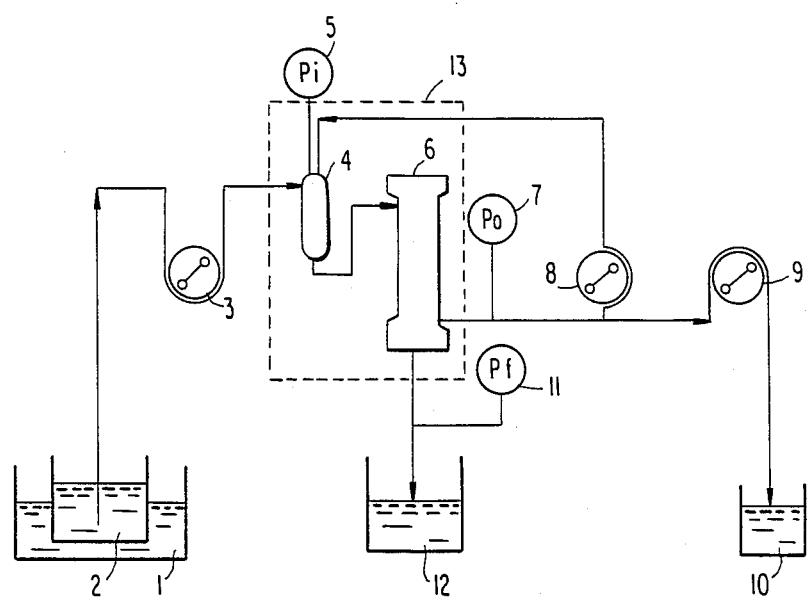
FIG. 4 shows one example of the flow systems of separating plasma components by use of a plasma components separator of this invention.

S: effective membrane area (m$^2$) representing the outer surface of the hollow fiber The permeation ratio for albumin rejection ratio of IgG, and rejection ratio of IgM were calculated from the concentration of the respective components of the feed plasma (Ci) and the concentration of respective components of the permeated plasma (Cf) obtained from the result of plasma components separation carried out according to the flow circuit shown in FIG. 4 under the conditions of the plasma feeding rate of 20 ml/min, recirculating rate of 100 ml/min and unpermeated residual plasma discarding rate of 2 ml/min by use of the fresh human plasma, which had the total protein concentration of about 5% after filtration by the plasma components separator, by the following equations. The concentration of albumin can be determined by the Bromocresol Green method and the concentrations of IgG and IgM can be determined by the single radial immunodiffusion method.

$$\text{Permeation ration (\%)} = Cf/Ci \times 100$$

$$\text{Rejection ratio(\%)} = (Ci - Cf)/Ci \times 100$$

The permeation ratio of dextran was calculated by the equation mentioned below from the concentration of dextran in the permeated liquid ($C_f^D$ mg/dl) obtained by the 15-minute permeation carried out by supplying a 50 mg/d aqueous solution of Dextran T-500 kept at 37° C. to the outside of the hollow fiber at a flow rate of 200 ml/min while letting the permeated liquid flow out from the inside of the hollow fiber at a flow rate of 100 ml/min. The concentration of dextran can be determined by use of a total organic carbon meter.

$$\text{Permeation ratio of dextran (\%)} = C_f^D/50 \times 100$$

The transmembrane pressure difference was calculated by the undermentioned equation from the pressure of the inflow plasma (Pi) flowing into the plasma components separator to be subjected to the filtration there, pressure of the outflow plasma (Po), and the pressure of the filtrate (Pf) on the outer side of the plasma components separator respective measured in the flow circuit of plasma component separation as shown in FIG. 4.

$$\text{Transmembrane pressure difference (mmHg)} = (Pi+Po)/2 - Pf$$

Figure 3:
FIG. 3 shows a part of the same surface of gelated structure of a skin layer partially exfoliated, as seen under an electron microscope of 20,000 magnifications.

The thickness of the dense skin layer with a gelated structure formed at least on one side of the hollow fiber membrane can be determined from observation under an electron microscope as shown in FIG. 3.

The invention will be further illustrated by the following examples.

EXAMPLE 1

A dope consisting of 18.5% cellulose diacetate of 52% acetylation, 20% formamide, 10% urea, 0.5% $CaCl_2.2H_2O$, and 51% acetone/methanol (3/1) was prepared. After its filtration, the dope was subjected to wet spinning process with the use of circular nozzles.

The components of the coagulating solution were water/methanol (1:1) and the coagulating solution for the inside of the hollow yarn was composed of water/methanol/formamide (5:4:1).

After washing with water, the hollow fibers were immersed in an aqueous solution of 55% glycerin kept at 30° C. and were then dried. The obtained hollow fiber measured 200μ in internal diameter and 60 μ in thickness. The amount of applied glycerin was 280% of the weight of the hollow fiber. The hollow fiber membrane thus prepared had a dense skin layer with approximately 0.1 μ thick gelated structure formed on the outer side. 5000 hollow fibers were collected into a bundle so that they might have an outer surface area of 1 m² and housed in a chamber to form a plasma components separator (hereinafter referred to as a module).

After the module was washed with water, the continuous permeation test was conducted by use of plasma obtained by filtrating a mixture prepared by a ratio of 1 l of fresh human plasma to 5000 units of heparin with the plasma separator (TP-50) and kept at 37° C. while operating the plasma supplying pump at a rate of 20 ml/min, the recirculating pump at a rate of 100 ml/min, and the discarded plasma outlet pump at a rate of 2 ml/min according to the flow circuit as shown in FIG. 4.

The results: the transmembrane pressure difference of 36 mmHg obtained 1 hour the filtration started; permeation ratio of albumin, 93%; rejection ratio of IgG, 25% and rejection ratio of IgM, 85%. The filtration was further continued and the transmembrane pressure difference gradually increased up to 98 mmHg. At this time, permeation ratio of albumin, rejection ratio of albumin, rejection rate of IgG, and rejection rate of IgM were 88%, 32%, and 89% respectively. The total filtration amount was 4.8 l.

Another module was prepared according to the same method as the aforementioned module. The use of this module gave the ultrafiltration rate (UFR) for water of 210 ml/m².hr.mmHg and the permeation rate of Dextran T-500 of 45%.

In case where the amount of applied glycerin was set at 130% in preparing this hollow fiber, the transmembrane pressure difference increased rapidly and marked 310 mmHg 1 hour after the filtration was started and the permeation rate of albumin was less than 30%. The ultrafiltration rate (UFR) for water was 125 ml/m².hr.mmHg and the permeation rate of Dextran T-500 was 15%.

EXAMPLE 2

A dope was prepared with components of 18.5% cellulose diacetate of 52% acetylation, 30% formamide, 5% urea, and 66.5% acetone-methanol (3:1). After its filtration, the dope was wet spun through the circular nozzles. The same coagulating bath and other conditions as those in Example 1 were also applied to this example.

The hollow fibers were immersed in an aqueous solution of 50% glycerin and were then dried. The amount of applied glycerin was 220%, the internal diameter of the hollow fiber was 200 μ and the thickness of the membrane was 60 μ. This hollow fiber membrane had an approximately 0.15 μ thick layer of gelated structure formed on its outer surface.

The same continuous filtration test as Example 1 was conducted. One hour after the start of the filtration, the transmembrane pressure difference was 30 mmHg, permeation rate of albumin was 91%, IgG rejection rate was 26%, and IgM rejection rate was 83%. When the filtration was continued until the transmembrane pressure difference increased up to about 100 mmHg, the amount of the filtrated plasma reached into 4.9 %, and the permeation rate of albumin was 86%, IgG rejection rate was 30%, and IgM rejection rate was 87%.

The ultrafiltration rate (UFR) for water was 210 m%/m².hr.mmHg and the permeation rate of Dextran T-500 was 42% when measured with the use of a module prepared in the same way as the one used in the above.

EXAMPLES 3, 4 AND REFERENTIAL EXAMPLES 3, 4

After the hollow fibers spun in Example 2 were washed with water, they were divided into 4 groups and each group was immersed in the respective aqueous solutions of 15%, 45%, 55%, and 85% glycerin kept at 30° C. and was then dried. Thus treated groups of hollow fibers were respectively collected to form modules of 5000 hollow fibers in such a way as to have an outer surface area of 1 m². However, the group of hollow fibers which had been immersed in an aqueous solution of 85% glycelin failed to form a module.

The obtained modules were washed with water and were subjected to the continuous filtration test under the same conditions as Example 1. The amount of applied glycerin and the results obtained in the filtration test are shown in Table 1. Incidentally, the permeation rate of albumin, rejection rate of IgG, and rejection rate of IgM shown in Table 1 are respectively the average values of those obtained at intervals of 30 minutes until the transmembrane pressure difference increased up to 100 mmHg.

TABLE 1

|  | Example 3 | Example 4 | Referential Example 3 | Referential Example 4 |
| --- | --- | --- | --- | --- |
| Conc. of aq. solution of glycerin | 45% | 55% | 15% | 85% |
| Amt. of applied glycerin | 215% | 345% | 105% | 385% |

TABLE 1-continued

| | Example 3 | Example 4 | Referential Example 3 | Referential Example 4 |
| --- | --- | --- | --- | --- |
| Permeation rate of albumin | 87% | 91% | 15% | Failed to form a module; measurements not available |
| Rejection rate of IgG | 27% | 31% | 95% | |
| Rejection rate of IgM | 78% | 82% | 99% | |
| Amt. of permeated plasma until TMP reaches 100 | 4.3 l | 4.5 l | 1.0 l | |

EXAMPLE 5

The hollow fiber membranes wet spun in Example 2 were washed with water, immersed respectively in an aqueous solution of 50% ethylene glycol, an aqueous solution of 50% sorbitol instead of glycerin, and dried at 50° C. The amounts of these applied polyhydric alcohols were about 250% respectively. These hollow fiber membranes had a layer of gelated structure formed to a thickness of about 0.15 $\mu$ on the outer surface. The plasma components separation tests were made for the fresh human blood plasma by using thus obtained hollow fiber membranes according to the same method as Example 1.

The results were good as in the case of the test where glycerin was used. The separating performance (permeation rate of albumin/rejection rate of IgM) of each module was 91/82, 89/85, and 85/90. Each module had a total amount of permeated plasma of 5.0 l, 4.5 l, and 4.0 l.

EXAMPLE 6

It has been confirmed in a series of tests that a gelated structure formed on the hollow fiber membrane immediately after its spinning can be maintained very effectively when it is made of cellulose acetate; however, it may be conceivably possible to apply this practice to other high polymer.

Ethylene-vinyl alcohol copolymer containing 30 mole % ethylene was dissolved in dimethyl sulfoxide. The solution was extruded through the circular nozzles into a coagulating bath of water-methanol-dimethyl sulfoxide (5:4:1), while using a solution of water-methanol (1:1) as a coagulating bath for the inside of the hollow fibers, thus producing hollow fiber membranes. After the spinning process, the hollow fiber membranes were washed with water, immersed in an aqueous solution of 40% glycerin and an aqueous solution of 60% glycerin respectively in two groups, and then dried. The amount of glycerin applied to the hollow fibers was 200% and 300% respectively and the ultrafiltration rate of water was 150 ml/m$^2$.hr.mmHg and 300 ml/m$^2$.hr.mmHg.

The plasma components separation performance tests carried out by use of fresh human plasma showed the permation rate of albumin of 90% and the rejection rate of IgM of 80% or more and it was also proved that the increase of permeation pressure was very small. The results thus obtained were much better than those previously reported (Japanese Laid-Open Patent Publication No. 155865/83 and Artificial Internal Organs, Vol. XIII, No. 2, pp 931~934 (1984))

INDUSTRIAL APPLICATIONS

The follow fiber membrane of this invention has an especially outstanding property of separating performance in the plasma components separation because of its layer with a gelated structure formed on its surface and it may further be used in the ultrafiltration of proteins, etc. and also in the separation of any other fluids.

What is claimed is:

1. An apparatus for plasma components separation comprising a separating means consisting of hollow fiber membranes having every property required for carrying out plasmapheresis including a high albumin recovery ratio, a high ratio of IgM removal and a little-lowering of separation efficiency to clogging developed on the hollow fiber membrane, a chamber to house these membranes, an inlet means to draw in a liquid material which contains plasma components, an outlet means to allow the filtrate to flow out, and another outlet means to allow the unpermeated residual liquid material to flow out, thus forming an apparatus of hollow fiber membrane type for separating plasma components which is characterized by having, as a separating means, a permselective hollow fiber membrane, made from a wet spinnable organic high polymer, having a dense skin layer of gelated structure made to a thickness of 1 $\mu$ or less on at least one surface of the membrane and the rest being made up into a porous layer, made to have the ultrafiltration rate of water ranging from 50 to 350 ml/m$^2$.hr.mmHg, and also, in the continuous filtration of human plasma components, made to have the albumin permeation rate of more than 80%, the immunoglobulin M rejection rate of more than 70%, and the total amount of the filtrate of more than 3 l per 1 m$^2$ of the effective surface area of the hollow fiber membrane.

2. A permselective hollow fiber membrane which comprises a hollow fiber membrane having every property required for carrying out plasmapheresis including a high albumin recovery ratio, a high ratio of IgM removal and a little-lowering of separation efficiency to clogging developed on the hollow fiber membrane, made of a wet spinnable organic high polymer, consisting of a dense skin layer having thickness of less than 1 $\mu$ with a gelated structure formed on at least one surface of the hollow fiber membrane, and a porous layer, made to have ultrafiltration rate of water raning from 50 to 350 ml/m$^2$.hr.mmHg, and also, in continuous filtration of human plasma components by feeding continuously fresh human blood plasma at the surface having said dense skin layer and discarding continuously filtrate, made to maintain albumin permeation ratio of more than 80% and immunoglobulin M rejection ratio of more than 70%, and to have total amount of said filtrate of more than 3 l per 1 m$^2$ or effective surface area of the hollow fiber membrane.

3. A permselective hollow fiber membrane according to claim 2 wherein said dense skin layer is formed on the outer surface of the hollow fiber membrane.

4. A permselective hollow fiber membrane according to claim 2, wherein immunoglobulin G rejection rate is more than 20% in said continuous filtration of human plasma components.

5. A permselective hollow fiber membrane according to claim 1, wherein said ultrafiltration rate for water is in the range of 150 to 350 ml/m$^2$.hr.mmHg.

6. A permselective hollow fiber membrane according to claim 1, wherein transmembrane pressure difference is less than 100 mmHg in said continuous filtration of human plasma components.

7. A permselective hollow fiber membrane according to claim 1, wherein permeation ratio of dextran is in the range of 20 to 70% determined in permeation of an aqueous solution containing dextran of weight average molecular weight of 500,000 at a rate of 50 mg/dl.

8. A permselective hollow fiber membrane according to claim 1, wherein said organic high polymer is at least one kind of polymer selected from cellulose ester, polymethyl methacrylate, polyvinyl alcohol, ethylene-vinyl alcohol copolymer, polyacrylonitrile, and polysufone.

9. An apparatus for plasma components separation comprising a chamber having inlet means to receive liquid material which contains plasma components, outlet means to allow filtrate to flow out of said chamber and other outlet means to allow unpermeated residual liquid material to flow out of said chamber, and containing mounted in said chamber permselective hollow fiber membranes having every property required for carrying out plasmapheresis including a high albumin recovery ratio, a high ratio of IgM removal and a little-lowering of separation efficiency to clogging developed on the hollow fiber membrane, wherein each of said permselective hollow fiber membranes comprises a hollow fiber membrane made of a wet spinnable organic high polymer, consisting of a dense skin layer having thickness of less than $1\mu$ with a gelated structure formed on at least one surface of the hollow fiber membrane, and a porous layer, made to have ultrafiltration rate of water ranging from 50 to 350 ml/m$^2$.hr.mmHg, and also, in continuous filtration of human plasma components by feeding continuously fresh human blood plasma at the surface having said dense skin layer and discarding continuously filtrate, made to maintain albumin permeation ratio of more than 80% and immunoglobulin M rejection ratio of more than 70%, and to have total amount of said filtrate of more than 3 l per 1 m$^2$ of effective surface area of the hollow fiber membrane.

* * * * *